US007412302B2

(12) United States Patent
Cobb et al.

(10) Patent No.: US 7,412,302 B2

(45) Date of Patent: Aug. 12, 2008

(54) PHARMACEUTICAL SINGULATION COUNTING AND DISPENSING SYSTEM

(75) Inventors: William Robert Cobb, Spartanburg, SC (US); Michael Wayne Davis, Simpsonville, SC (US); Howitt Spurling Smith, Cross Hill, SC (US); Justin Daniel Wyatt, Clinton, SC (US); Warren Daniel Leonard, Boiling Springs, SC (US); Darol Blake Foster, Moore, SC (US); Kevin Franklin Spicer, Gaffney, SC (US); Barton Carter Mitchell, Pauline, SC (US)

(73) Assignee: JM Smith Corporation, Spartanburg, SC (US)

( * ) Notice: Subject to any disclaimer, the term of this patent is extended or adjusted under 35 U.S.C. 154(b) by 264 days.

(21) Appl. No.: 11/101,846

(22) Filed: Apr. 8, 2005

(65) Prior Publication Data

US 2006/0225383 A1 Oct. 12, 2006

(51) Int. Cl.
*G06F 17/00* (2006.01)

(52) U.S. Cl. ....................... 700/243; 700/231; 700/232; 700/241

(58) Field of Classification Search ......... 221/1–312 C; 700/231–244
See application file for complete search history.

(56) References Cited

U.S. PATENT DOCUMENTS

| | | | | | |
|---|---|---|---|---|---|
| 1,502,053 | A | | 7/1924 | Elof | |
| 2,389,496 | A | | 11/1945 | Gagnon et al. | |
| 2,523,517 | A | | 9/1950 | Potter | |
| 2,941,652 | A | | 6/1960 | Miller | |
| 3,357,536 | A | | 12/1967 | Kelly | |
| 3,376,970 | A | | 4/1968 | Rosenberg | |
| 3,490,574 | A | | 1/1970 | Bott et al. | |
| 3,669,260 | A | | 6/1972 | Hoppmann et al. | |
| 3,677,437 | A | | 7/1972 | Haigler | |
| 3,722,674 | A | | 3/1973 | Hoppmann et al. | |
| 3,722,740 | A | | 3/1973 | List | |
| 3,746,211 | A | | 7/1973 | Burgess, Jr. | |
| 3,837,139 | A | | 9/1974 | Roseberg | |
| 3,978,641 | A | | 9/1976 | Tollefsbol | |
| 4,013,192 | A | * | 3/1977 | Pillon | 221/7 |
| 4,379,504 | A | | 4/1983 | Salicini | |
| 4,382,527 | A | | 5/1983 | Lerner | |
| 5,369,940 | A | * | 12/1994 | Soloman | 53/501 |
| 5,638,417 | A | | 6/1997 | Boyer et al. | |
| 5,671,262 | A | | 9/1997 | Boyer et al. | |
| 5,720,154 | A | | 2/1998 | Lasher et al. | |
| 5,884,806 | A | | 3/1999 | Boyer et al. | |
| 5,927,546 | A | * | 7/1999 | Yuyama et al. | 221/265 |

(Continued)

*Primary Examiner*—Gene O. Crawford
*Assistant Examiner*—Michael K Collins
(74) *Attorney, Agent, or Firm*—Timothy J. Monahan; Monohan & Moses, LLC

(57) ABSTRACT

The present invention relates to an automated system for pharmaceutical singulation, counting and dispensing, whereby a bulk of stored pharmaceutical units are singulated into a single file line for counting and dispensing. With reference to the drawings, the pharmaceutical singulation, counting and dispensing system comprises generally, a deck assembly (A), a cylindrical chamber (B), a rotatable transport ring (C), a plurality of adjustable fingers (D), an adjustable reciprocating member (E), an adjustable rotatable member (F), a counting system (G), a hopper (H), and a control system (I).

20 Claims, 9 Drawing Sheets

U.S. PATENT DOCUMENTS

| | | | | |
|---|---|---|---|---|
| 6,053,302 | A | 4/2000 | Leu et al. | |
| 6,085,938 | A | 7/2000 | Coughlin | |
| 6,208,911 | B1 * | 3/2001 | Yamaoka et al. | 700/242 |
| 6,377,648 | B1 | 4/2002 | Culbert | |
| 6,421,584 | B1 * | 7/2002 | Norberg et al. | 700/242 |
| 6,471,093 | B1 | 10/2002 | Kodama | |
| 6,592,005 | B1 | 7/2003 | Coughlin et al. | |
| 6,681,149 | B2 | 1/2004 | William et al. | |
| 7,014,063 | B2 * | 3/2006 | Shows et al. | 221/211 |
| 2003/0024943 | A1 * | 2/2003 | MacDonald | 221/92 |

* cited by examiner

PHARMACEUTICAL SINGULATION COUNTING AND DISPENSING SYSTEM

BACKGROUND

The present invention relates to the field of automated systems for pharmaceutical singulation, counting and dispensing. In particular, the present invention relates to an individual pharmaceutical singulation, counting and dispensing apparatus of the pharmaceutical singulation, counting and dispensing system.

Automated systems for pharmaceutical singulation, counting and dispensing are known in the art, and each attempt to solve a deceptively complicated task, namely the automated reduction of pharmaceutical units from bulk storage into an easily countable line of pharmaceutical units. Previous systems however are quite large and expensive, making them difficult to retrofit into an existing community pharmacy, chain pharmacy, or institutional pharmacy designed and built when the pharmacist hand counted each and every prescription.

Previous systems further remain challenged to accurately count pharmaceutical units and avoid damaging or destroying pharmaceutical units in the process.

Thus, there remains a need for the improvement of automated systems for pharmaceutical singulation, counting and dispensing.

SUMMARY

The present invention relates to an automated system for pharmaceutical singulation, counting and dispensing, whereby a bulk of stored pharmaceutical units are singulated into a single file line for counting and dispensing. With reference to the drawings, the pharmaceutical singulation, counting and dispensing system comprises generally, a deck assembly A, a cylindrical chamber B, a rotatable transport ring C, a plurality of adjustable fingers D, an adjustable reciprocating member E, an adjustable rotatable member F, a counting system G, a hopper H, and a control system I.

Particularly the pharmaceutical singulation, counting and dispensing apparatus, comprises a deck assembly and a cylindrical chamber carried by the deck assembly which defines a storage section, a singulation section leading to an outlet, and a passage therebetween.

A rotatable transport ring carried by the deck assembly defining at least a portion of the bottom of the chamber sections and passage is operable to transport pharmaceutical units during rotation from the storage section through the singulation section to the outlet via the passage. The rotatable transport ring is driven by a motor for selectively rotating the transport ring.

A plurality of adjustable fingers depend into at least a portion of the singulation section portion of the passage, the fingers being configured to vertically singulate pharmaceutical units on the transport ring along the passage.

An adjustable reciprocating member is carried by the deck assembly adjacent a top portion of the transport ring and in contact with pharmaceutical units on the transport ring to horizontally singulate pharmaceutical units by changing the coefficient of friction along the transport ring;.

An adjustable rotatable member is carried by the deck assembly adjacent a top portion of the transport ring and in contact with singulated pharmaceutical units on the transport ring for separating pharmaceutical units by differential acceleration.

A counting system is employed for counting pharmaceutical units discharged through the outlet A hopper collects the discharged counted pharmaceutical units. The system is controlled by an electronic control system.

Whereby the present invention stores a bulk of pharmaceutical units, the bulk of stored pharmaceutical units are rotatably transported on the transport ring through the singulation section where the pharmaceutical units are singulated into a single file line for counting and dispensing.

DETAILED DESCRIPTION

Pharmaceutical unit: a caplet, capsule, pill or tablet for the oral or rectal delivery of a drug, vitamin or mineral product.

Singulation: process whereby a bulk of stored pharmaceutical units are oriented into a single file line.

Fingers: a projecting piece brought into contact with an object to affect its motion.

Depending: to hang down.

Reciprocating: to move forward and backward alternately.

Rotatable: ability to turn about an axis or a center.

Hopper: receptacle for the temporary storage of counted pharmaceutical units.

The present invention relates to an automated system for pharmaceutical singulation, counting and dispensing, whereby a bulk of stored pharmaceutical units are singulated into a single file line for counting and dispensing. With reference to the drawings, the pharmaceutical singulation, counting and dispensing system comprises generally, a deck assembly A, a cylindrical chamber B, a rotatable transport ring C, a plurality of adjustable fingers D, an adjustable reciprocating member E, an adjustable rotatable member F, a counting system G, a hopper H, and a control system I.

Figure 2:
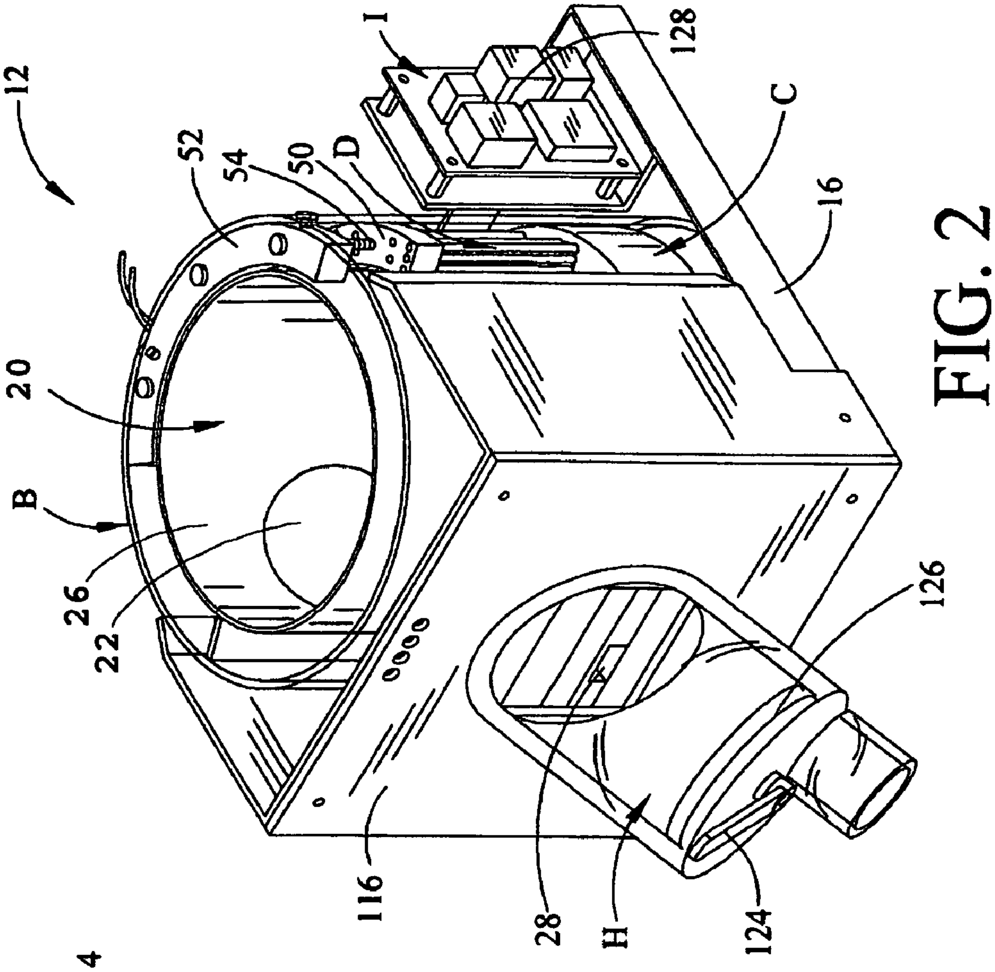
FIG. 2 is a front elevational view illustrating an individual pharmaceutical singulation, counting and dispensing bin of the system illustrated in FIG. 1 constructed in accordance with the invention.
Figure 1:
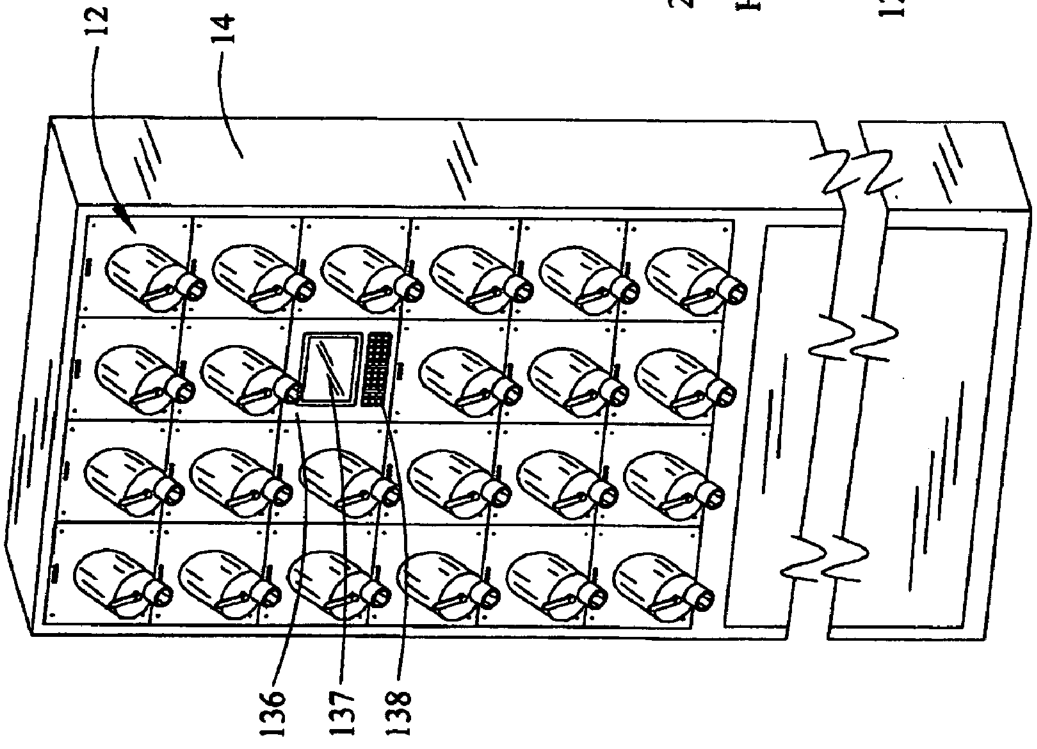
FIG. 1 is a front elevational view illustrating an automated system for pharmaceutical singulation, counting and dispensing constructed in accordance with the invention.
Figure 3:
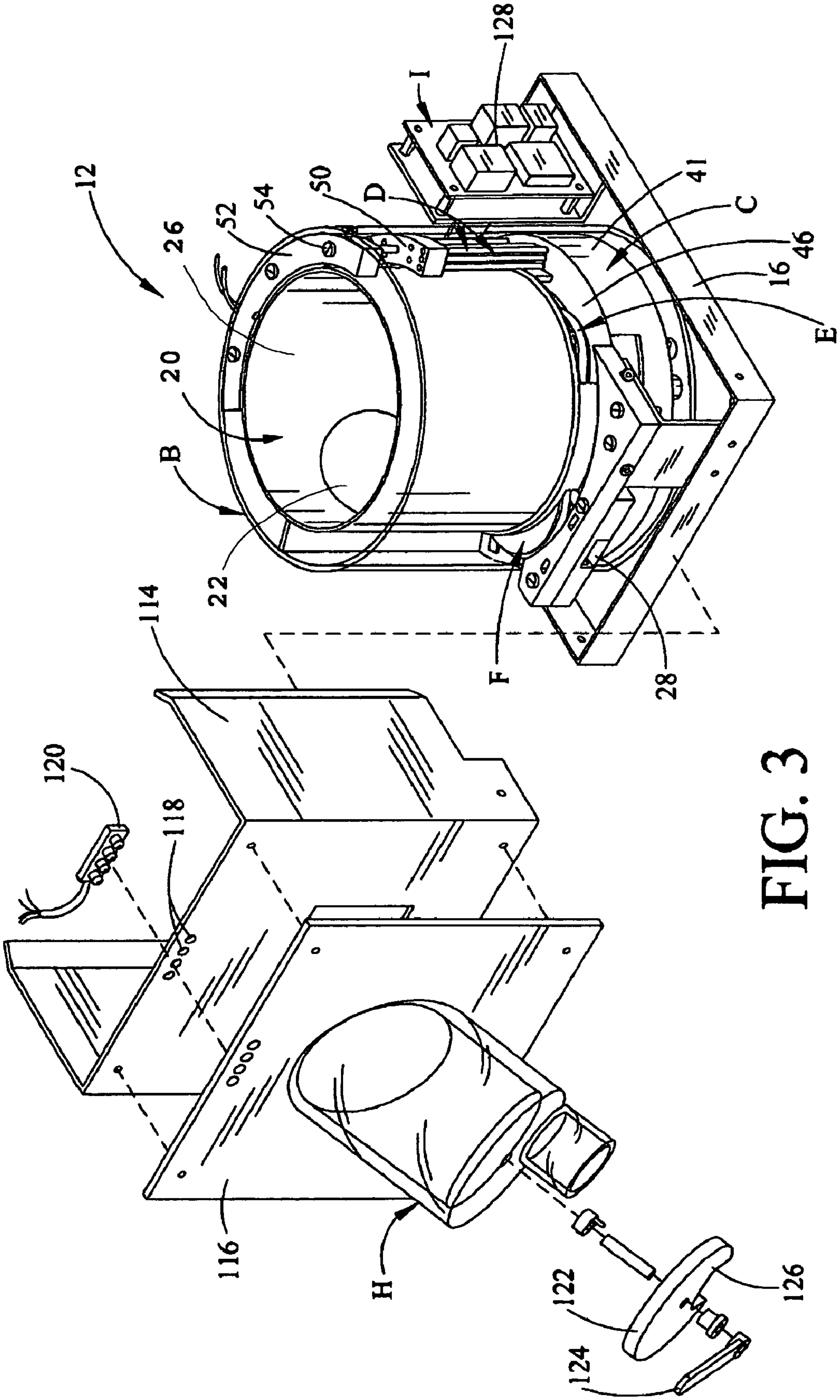
FIG. 3 is an exploded perspective view illustrating an individual pharmaceutical singulation, counting and dispensing bin of the system illustrated in FIG. 1 constructed in accordance with the invention.
Figure 4:
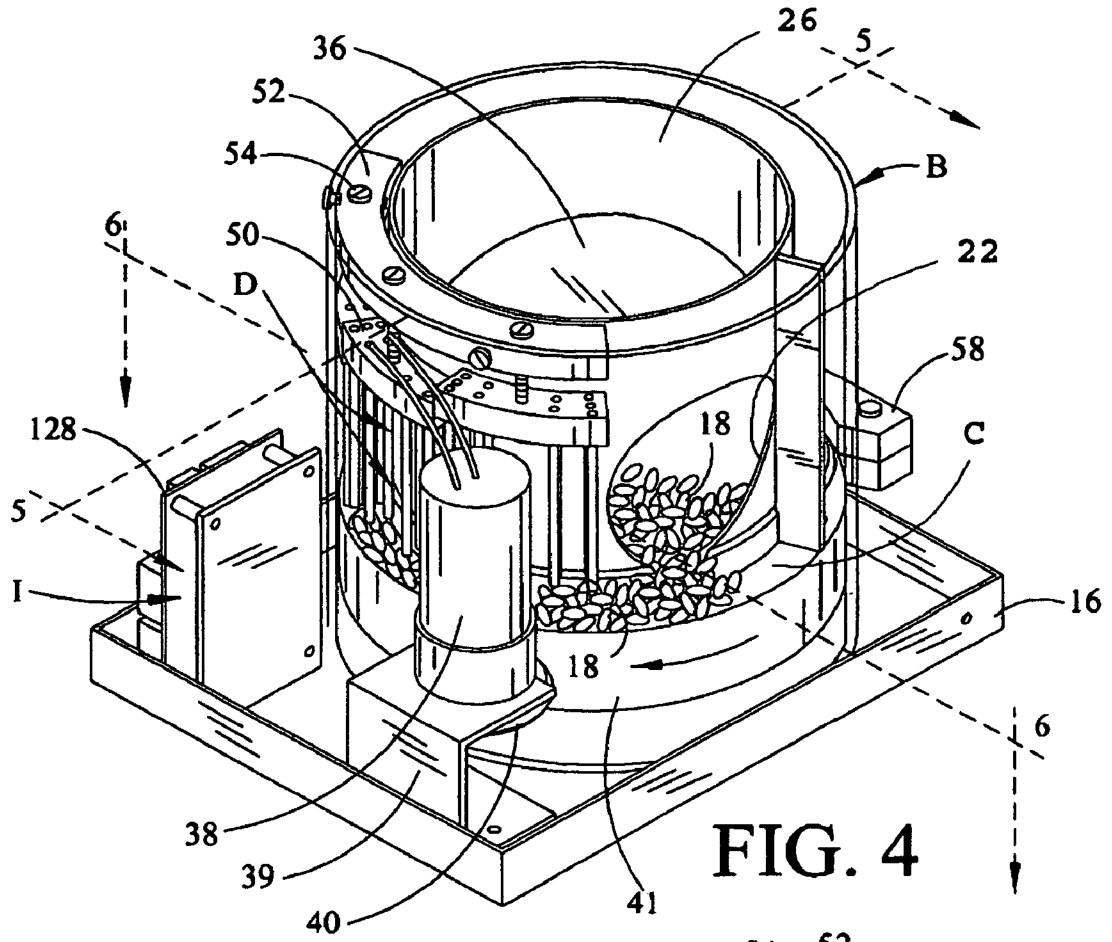
FIG. 4 is a rear elevational view illustrating an individual pharmaceutical singulation, counting and dispensing bin of the system illustrated in FIG. 1 constructed in accordance with the invention.
Figure 5:
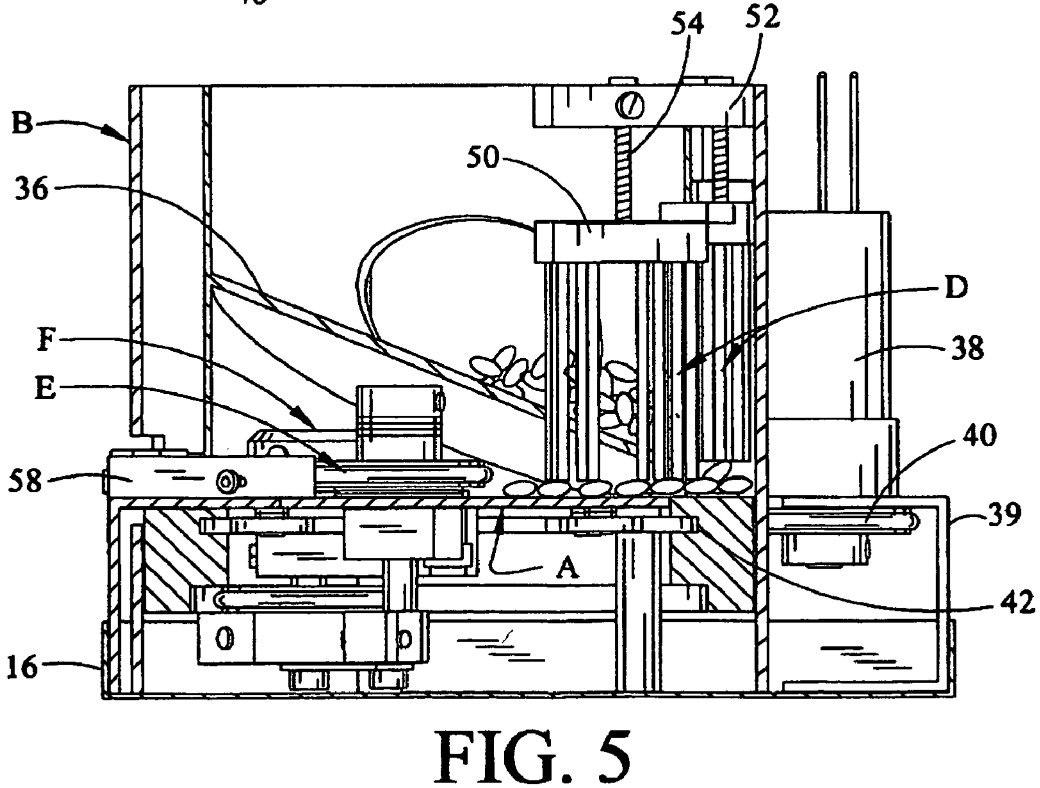
FIG. 5 is a cross-sectional view illustrating an individual pharmaceutical singulation, counting and dispensing bin of the system illustrated in FIG. 1 constructed in accordance with the invention.
Figure 7:
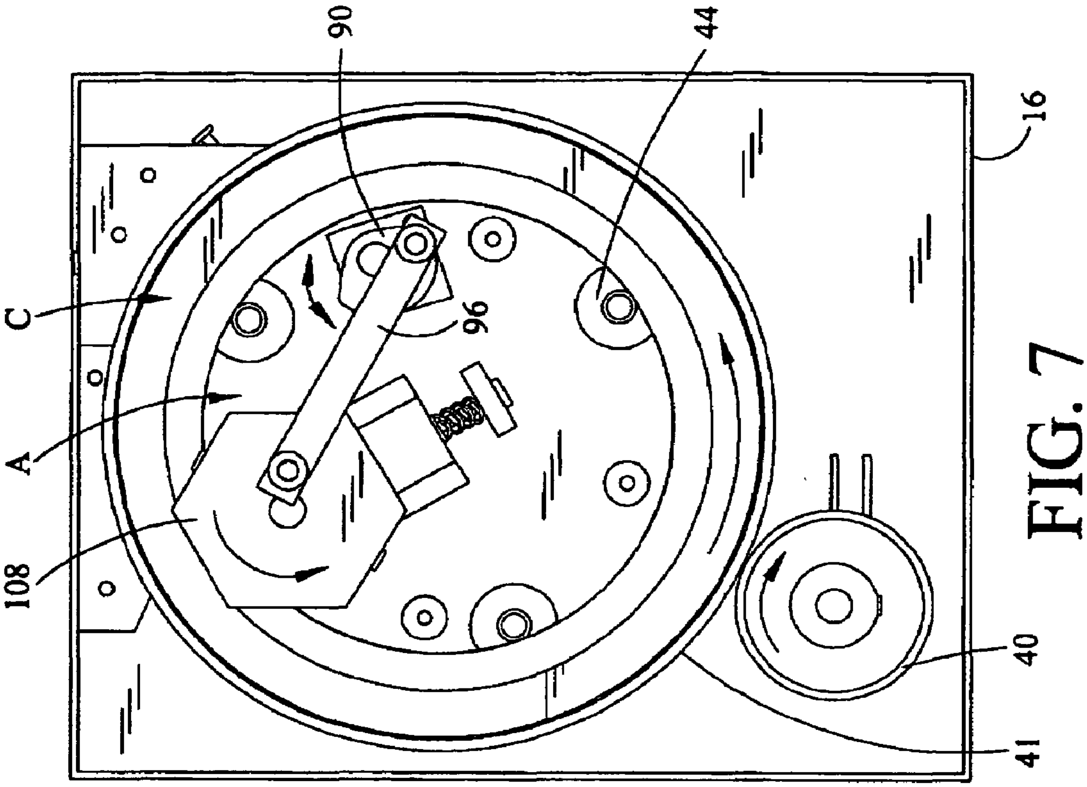
FIG. 7 is a bottom plan view illustrating an individual pharmaceutical singulation, counting and dispensing bin of the system illustrated in FIG. 1 constructed in accordance with the invention.
Figure 6:
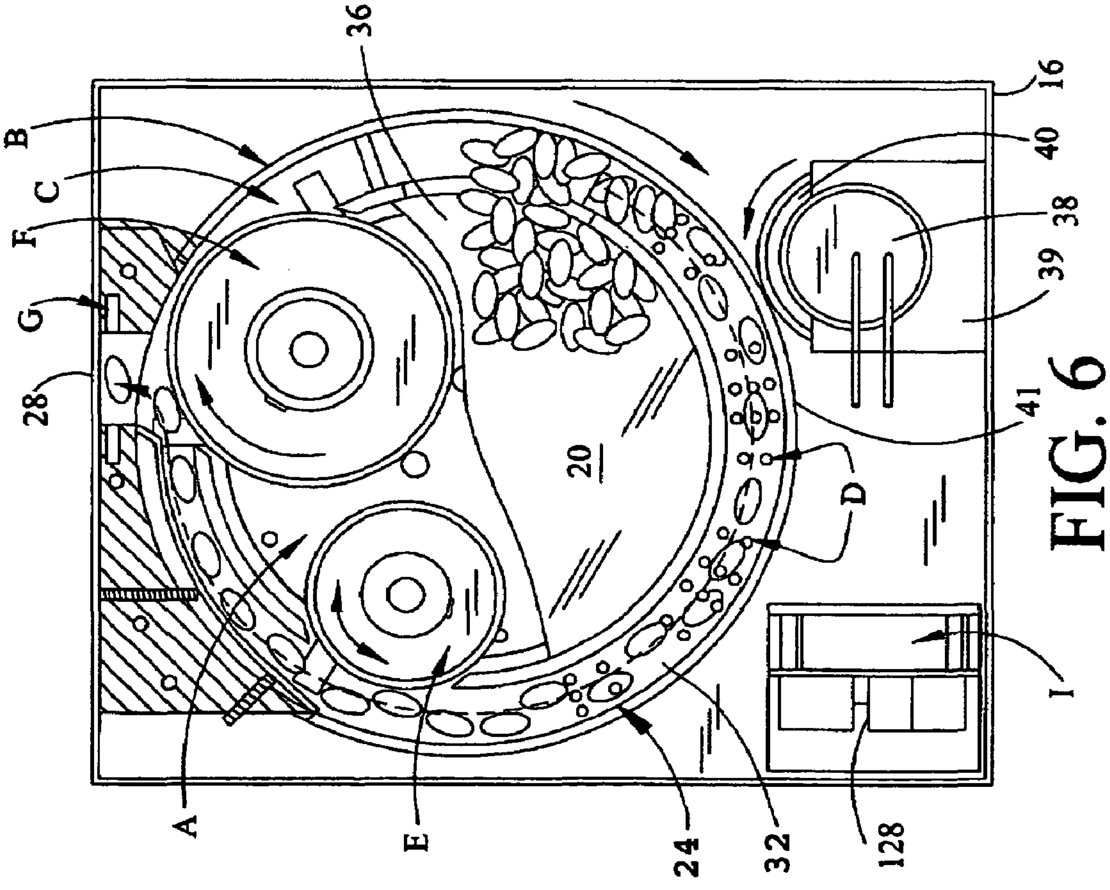
FIG. 6 is a top plan view illustrating an individual pharmaceutical singulation, counting and dispensing bin of the system illustrated in FIG. 1 constructed in accordance with the invention.
Figure 8:
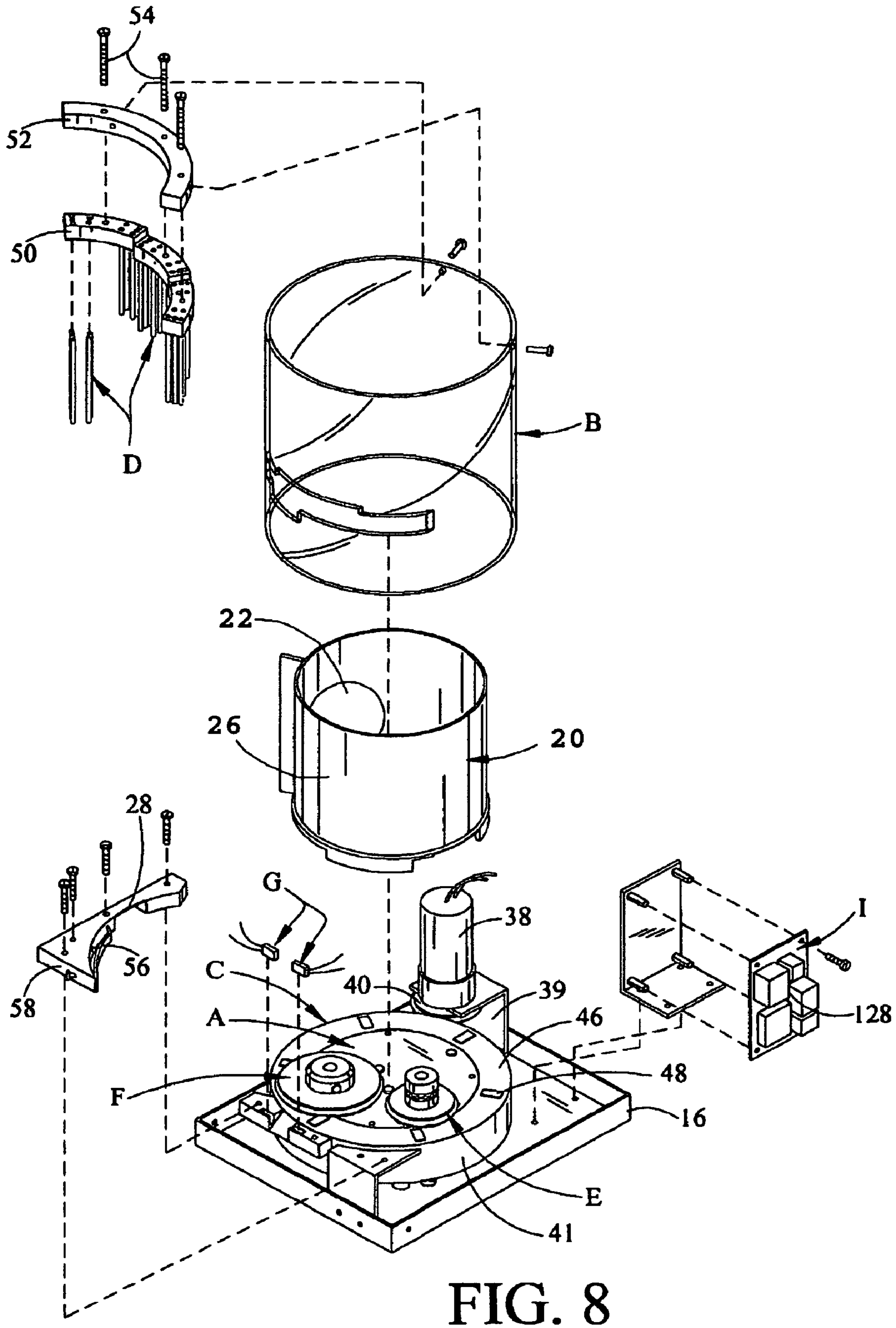
FIG. 8 is an exploded perspective view illustrating an individual pharmaceutical singulation, counting and dispensing bin of the system illustrated in FIG. 1 constructed in accordance with the invention.
Figure 10:
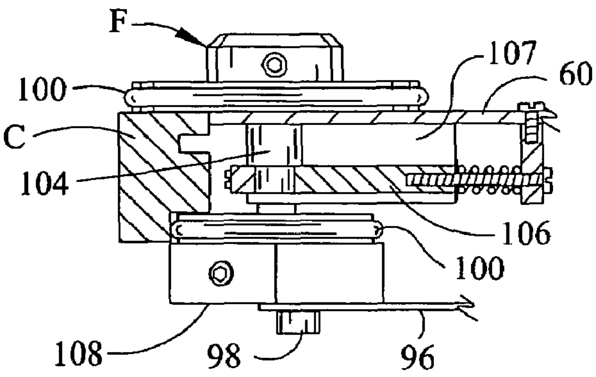
FIG. 10 is a side elevational view illustrating an individual pharmaceutical singulation, counting and dispensing bin of the system illustrated in FIG. 1 constructed in accordance with the invention.
Figure 9:
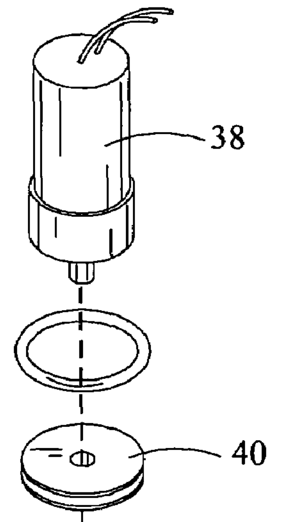
FIG. 9 is an exploded perspective view illustrating an individual pharmaceutical singulation, counting and dispensing bin of the system illustrated in FIG. 1 constructed in accordance with the invention.
Figure 9:
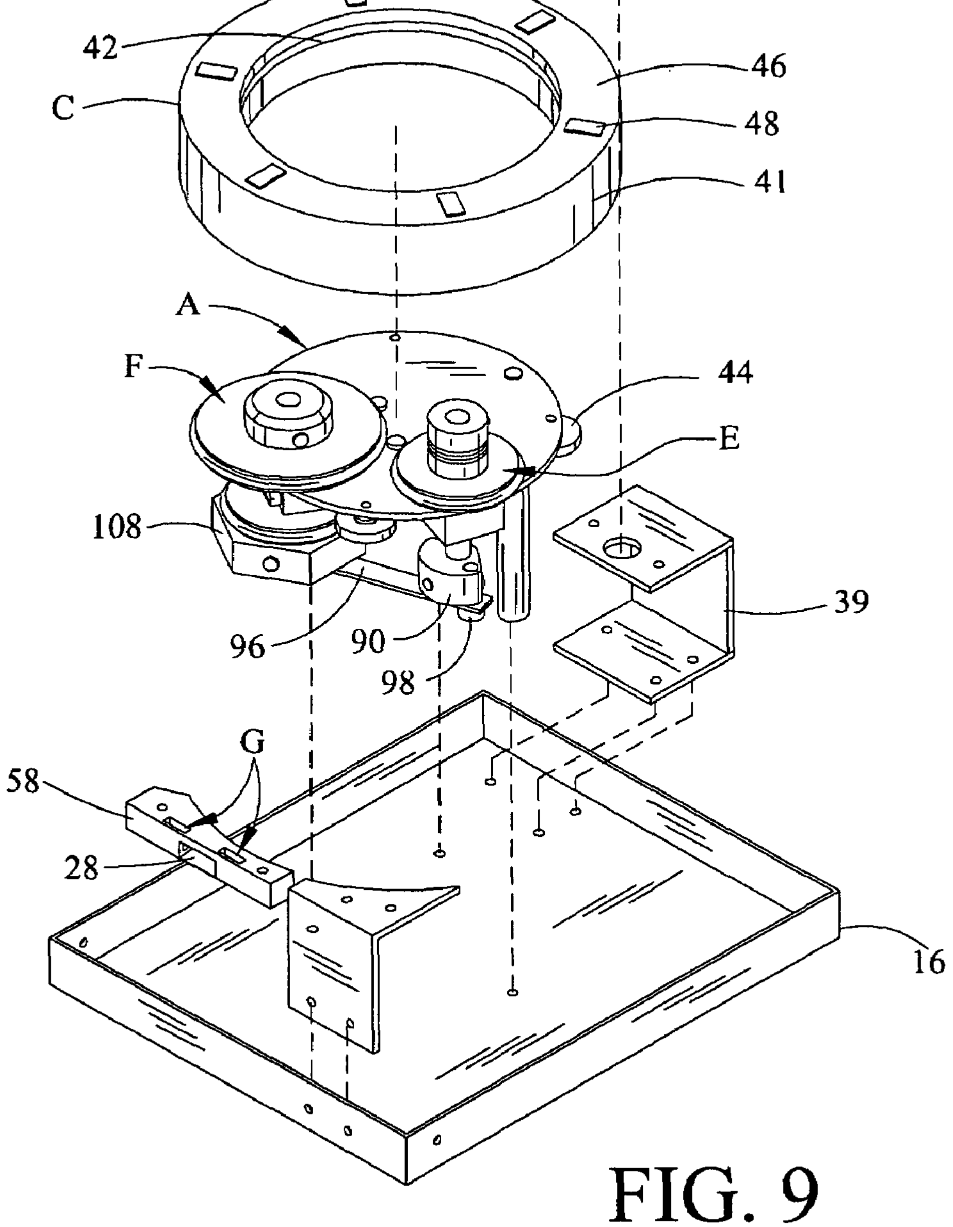
Figure 11:
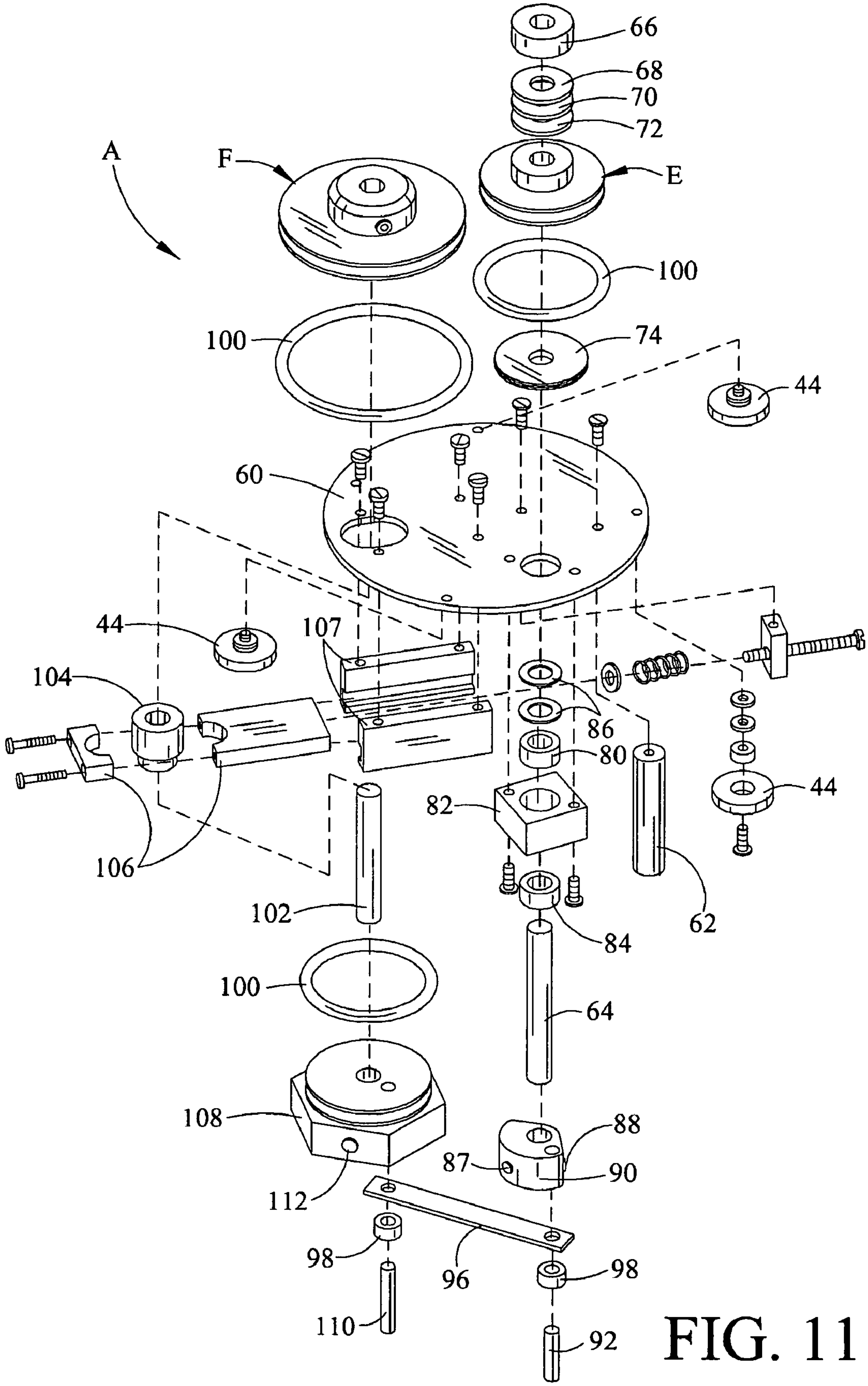
FIG. 11 is an exploded perspective view illustrating an individual pharmaceutical singulation, counting and dispensing bin of the system illustrated in FIG. 1 constructed in accordance with the invention.
Figure 12:
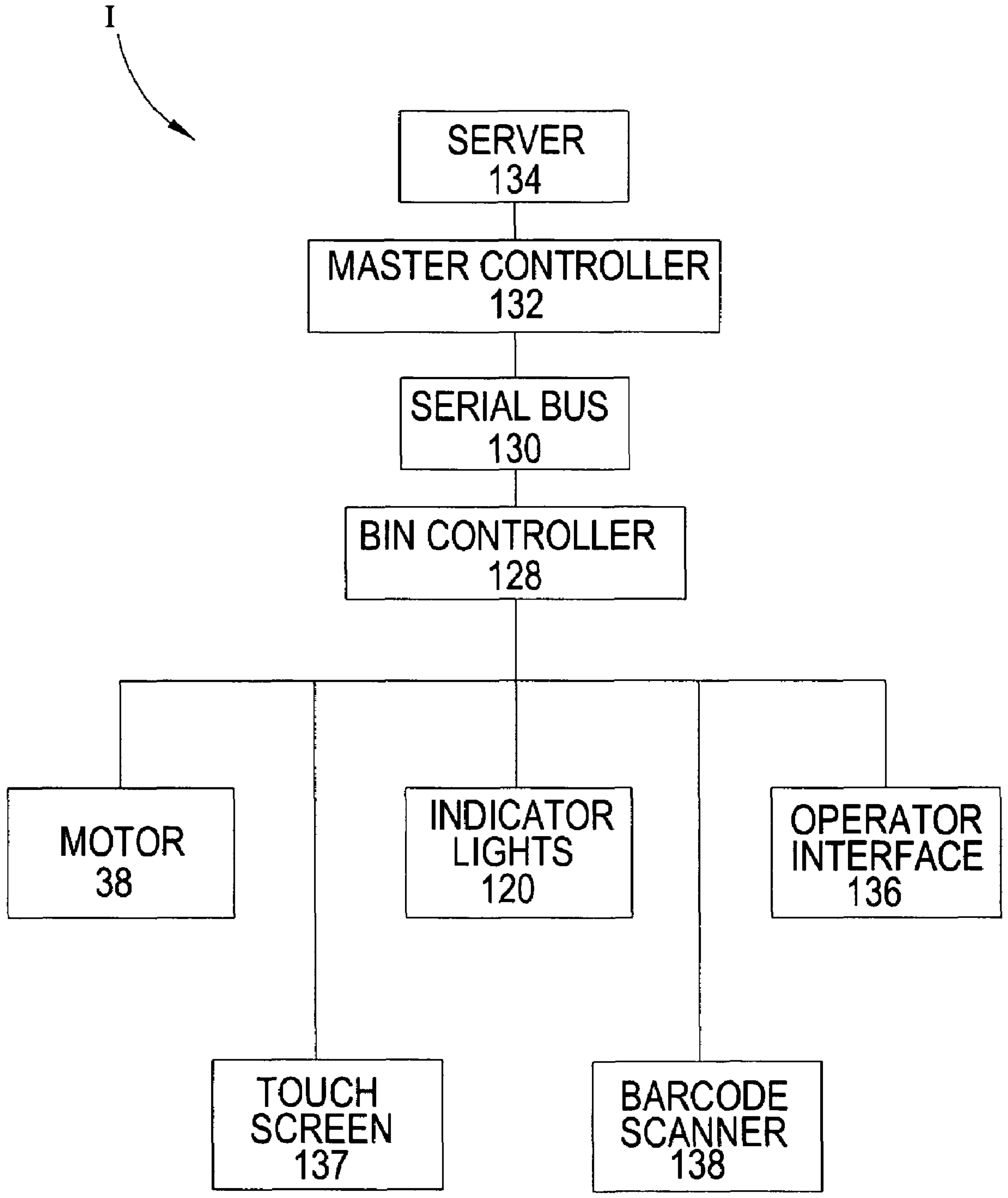
FIG. 12 is a schematic diagram illustrating the control system hierarchy of the automated system for pharmaceutical singulation, counting and dispensing constructed in accordance with the invention.
Figure 13:
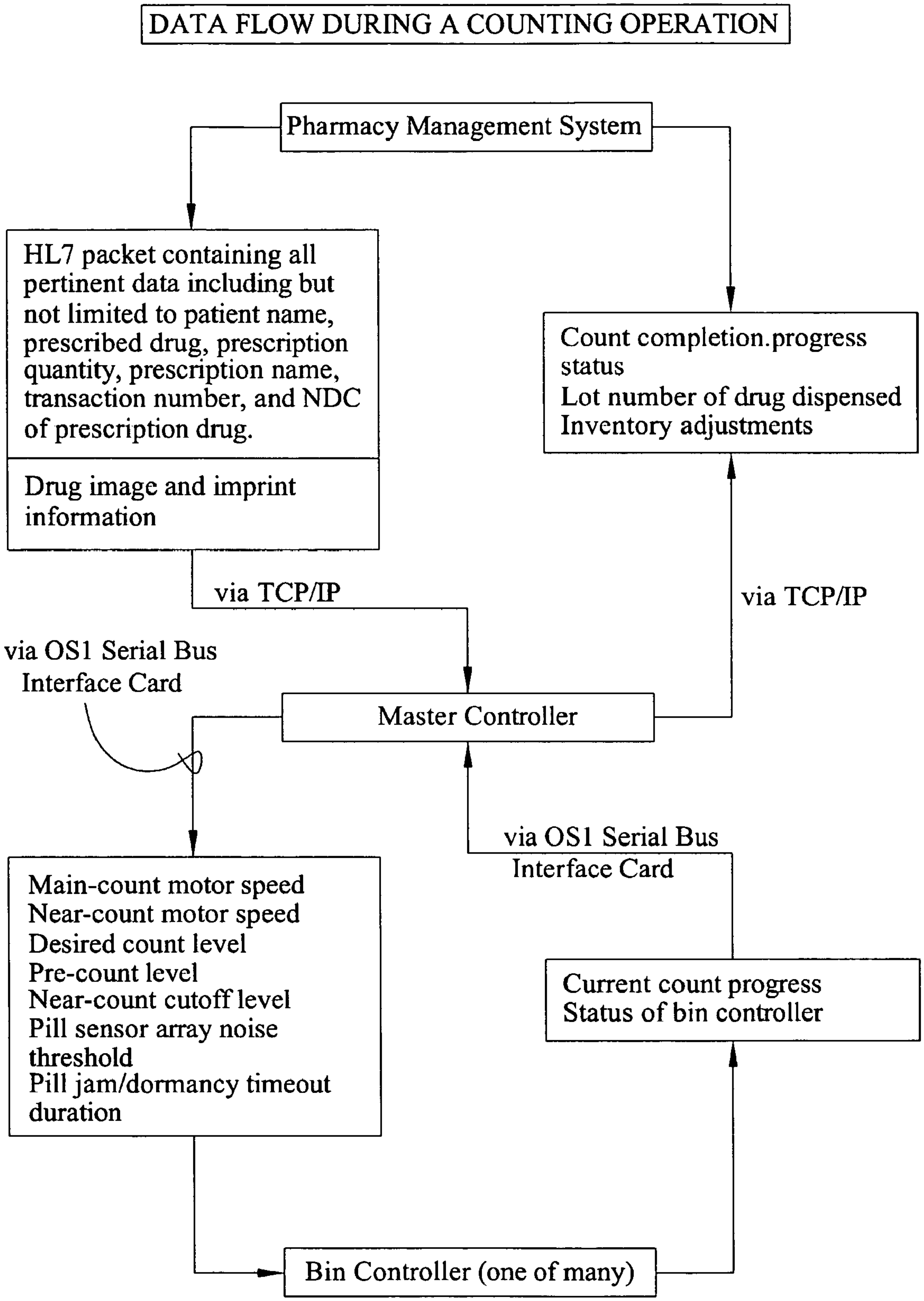
FIG. 13 is a schematic diagram illustrating the flow of data among the control system hierarchy of FIG. 12 of the automated system for pharmaceutical singulation, counting and dispensing constructed in accordance with the invention.

In a preferred embodiment, the pharmaceutical singulation, counting and dispensing bin 12 described below is linked with a plurality of other pharmaceutical singulation, counting and dispensing bins 12 to form an automated system for pharmaceutical singulation, counting and dispensing. With reference to FIG. 1, one embodiment of the present invention is shown, an automated system for pharmaceutical singulation, counting and dispensing comprising twenty-three individual pharmaceutical singulation, counting and dispensing bins 12 within a cabinet 14 for storing and dispensing various types of pharmaceutical units such as pills, capsules and caplets.

While technically there are no limits on the number of bins 12 that may be linked, practical concerns such as floor space within a pharmacy typically dictates otherwise. It has been found that an automated system comprising twenty-three to forty-eight bins 12 will serve the majority of operators both in terms of the footprint of the system and the systems technical ability to store, singulate, count and dispense the plethora of pharmaceutical units carried by the operator.

Typically a single bin 12 is optimally configured to store, count and dispense only one type of pharmaceutical unit. The bins, however, are adjustable and the bin may be reconfigured with ease. Depending upon pill size and popularity, an operator may choose to run two, or more, bins 12 with the same pharmaceutical unit.

Deck assembly A is described in further detail below.

The cylindrical chamber B is carried by the deck assembly A and defines a storage section 20, a singulation section 24 leading to an outlet 28, and a passage 32 therebetween. Covering the deck assembly A and forming the floor of the storage section 20 is deck guard 36. In conjunction with the cylindrical chamber B the deck guard 36 stores the bulk pharmaceutical units 18 prior to singulation, counting and dispensing. The floor of the deck guard 36 floor is preferably sloped, with the low portion of the floor carried adjacent to a top portion of the transport ring C whereby the bulk pharmaceutical units feed by gravity onto the top of the transport ring through opening 22 in the wall 26 of storage section 20.

Rotatable transport ring C is carried by the deck assembly and defines at least a portion of the bottom of the chamber sections and passage. The transport ring is operable to transport pharmaceutical units during rotation from the storage section 20 through the singulation section 24 to the outlet 28 via the passage 32.

The rotatable transport ring C is selectively driven by motor 38. Motor 38 is carried by motor mount 39 which is fixed to base plate 16 via pivot joint 17A and spring 17B. A variable speed and direction motor is preferred. The motor is connected to a drive wheel 40. Drive wheel 40 is spring loaded in communication with a side portion 41 of transport ring C for selectively rotating the transport ring.

The rotatable transport ring C is preferably configured with a groove 42, which receives rollers 44 carried by the deck assembly. Rollers 44 permit the transport ring C to rotate around the deck assembly A when driven by motor 38 and drive wheel 40.

The top portion 46 of the transport ring C may be smooth, textured or may contain a plurality of surface configuration members 48. The surface configuration members 48 may adhere to the surface of a smooth top portion 46, or the top portion 46 may be notched to receive a plurality of surface configuration members 48. Surface configuration members 48 alter the friction coefficient along the transport ring C during rotation thereof, and may comprise a variety of textures, shapes and sizes.

A plurality of adjustable fingers depends into at least a portion of the singulation section 24 portion of the passage 32. The fingers D are configured to vertically singulate and partially horizontally singulate pharmaceutical units on the transport ring C along the passage 32. The fingers D are carried by blocks 50 which are operably connected to a block mount 52 via a series of fasteners 54. Cylindrical chamber B carries block mount 52.

The series of fasteners 54 operably connecting the blocks 50 with the block mount permit the vertical adjustment of the fingers about a top portion 46 of the transport ring C. Particularly, the fingers may be adjustably placed in contact with a top portion 46 of the transport ring C or adjustably distanced from said top portion 46 of the transport ring C. This adjustment is accomplished via fasteners 54 which connect blocks 50 and block mount 52 in a screwjack arrangement by which rotation of fasteners 54 in one direction lowers blocks 50 and fingers D toward a top portion 46 of the transport ring C, and rotation of fasteners 54 in an opposite direction raises blocks 50 and fingers D away from a top portion 46 of the transport ring C.

In the embodiment illustrated a plurality of blocks 50 are shown, however a unitary block is also contemplated. Further, the fingers D carried by blocks 50 may vary in length and diameter.

The plurality of adjustable fingers D are configured to vertically singulate pharmaceutical units on the transport ring C along the passage 32. In a preferred embodiment this is accomplished utilizing the fingers D as carried and configured by blocks 50 in a reverse staircase arrangement so as to "step-down" the height of passage 32 along the transport ring C such that the bulk pharmaceutical units transported along the ring are singulated into a pharmaceutical unit line one unit high.

Fingers D are preferably constructed of a flexible FDA approved material that will not destroy or deform pharmaceutical units.

A reciprocating member E is carried by the deck assembly A adjacent a top portion 46 of the transport ring C in contact with pharmaceutical units on the transport ring C to horizontally singulate pharmaceutical units by changing the coefficient of friction along the transport ring.

An adjustable rotatable member F is carried by the deck assembly A adjacent a top portion 46 of the transport ring C in contact with singulated pharmaceutical units on the transport ring for separating pharmaceutical units by differential acceleration.

Rotatable member F is driven by motor 38, preferably via the transport ring C. A link bar 96 connects rotatable member F and reciprocating member E. Link bar 96 is offset from the vertical axis of rotatable member F, but is offset more from the vertical axis of reciprocating member E. As rotatable member F rotates, the offset link bar reciprocates reciprocating member E.

Reciprocating member E horizontally singulates pharmaceutical units along the transport ring, allowing only a single file line of pharmaceutical units along the passage to the rotatable member F. As should be evident, reciprocating member moves both in the direction of the transport ring, and against it. This motion prevents bridging of the pharmaceutical units.

Reciprocating member E is replaceable, such that the distance between a side portion of the chamber (and outer perimeter of the transport ring) and the portion of the reciprocating member in contact with the pharmaceutical units may be varied depending upon pharmaceutical unit size, shape, texture or weight.

In the embodiment illustrated reciprocating member E comprises a wheel; however other configurations are contemplated, such as fingers, spokes, or other geometric configurations. Additionally the portion of the reciprocating member in contact with pharmaceutical units along the transport ring may have alterable surface configurations members which may assist in grabbing or catching the pharmaceutical units depending upon their size, shape, texture, or weight.

Rotatable member F horizontally separates pharmaceutical units along the transport ring C by differential acceleration. Separation by differential acceleration assists in the counting of the pharmaceutical units to be dispensed.

As described above, only a single file line of pharmaceutical units pass along the passage to the rotatable member F. Rotatable member F rotates greater than or equal to the speed of the transport ring C, and rotates in the same direction as the transport ring. Preferably singulated pharmaceutical units along the transport ring contact the rotatable member F as the rotatable member F rotates at a speed slightly higher than the rotation speed of the transport ring C. Upon encountering the higher speed rotating member F, pharmaceutical units are accelerated and bumped off of the transport ring C through outlet 28 to be counted, collected and dispensed. This differential acceleration separates pills being bumped off the transport ring C to be counted from pills on the transport ring.

Rotatable member F is adjustable, such that the distance between a side portion of the chamber (and outer perimeter of the transport ring) and the portion of the rotatable member F in contact with the pharmaceutical units may be varied depending upon pharmaceutical unit size, shape, texture or weight.

In the embodiment illustrated rotatable member F comprises a wheel; however other configurations are contemplated, such as fingers, spokes, or other geometric configurations. Additionally the portion of the reciprocating member in contact with pharmaceutical units along the transport ring may have alterable surface configurations members which may assist in grabbing or catching the pharmaceutical units depending upon their size, shape, texture, or weight.

Reciprocating member E and rotatable member F are assisted by adjustable guide arm 56 carried by block 58. Block 58 is carried by base plate 16 and is preferably configured to correspond to the transport ring C. As the transport ring C is generally circular in configuration, the distance between reciprocating member E and rotatable member F is not a straight line, but an arc. Due to the rotation of the transport ring, centrifugal force acting on the pharmaceutical units along the transport ring tends to force the pharmaceutical units away from the central axis of the transport ring. This force, unless countered, may bridge pharmaceutical units along the transport ring between the reciprocating member E and rotatable member F. Adjustable guide arm 58 counters this centrifugal force, by acting as a generally straight guide for pharmaceutical units from the reciprocating member E to the rotatable member F.

Guide arm 58 is adjustable, such that the distance between the inner perimeter of the transport ring and guide arm in contact with the pharmaceutical units may be varied depending upon pharmaceutical unit size, shape, texture or weight.

Deck assembly A comprises a deck plate 60 which is secured to base plate 16 via support 62. Reciprocating member E is carried by the deck plate 60 about reciprocating member shaft 64. The reciprocating member E is secured about reciprocating member shaft 64 above a top portion of the deck plate 60 with fastener 66, washer 68, washer 70 and washer 72. Fastener 66 is secured to the shaft 64, washers 68, 70, 72 act as a clutch, leaving reciprocating member E free to rotate about the shaft. O-rings 100 may be carried by an outer portion of the reciprocating member E in contact with pharmaceutical units. Reciprocating member E may carry two O-rings, or alternatively to O-rings may carry flat bands.

Reciprocating member E rides on the deck plate 60 with three piece thrust bearing 74 and washers 76, 78. Bearing 80 is secured via support boss 82 and fasteners 83

Below the deck plate 60 reciprocating member E is secured about reciprocating member shaft 64 to crank 90 via bearing 80, boss 82, fasteners 83, bearing 84 and washer 86. Fastener 87 secured crank 90 to the shaft 94.

Crank 90 receives and secures pin 92 with fastener 88. Crank 90 is connected to the link bar 96 with washer 94 and fastener 98.

Deck assembly A further comprises a rotatable member F carried by the deck plate 60 about pin 102. The rotatable member F is secured about shaft 64 above a top portion of the deck plate 60 with fastener 103. O-rings 100 may be carried by an outer portion of the rotatable member F in contact with pharmaceutical units. Rotatable member F may carry two O-rings, or alternatively to O-rings may carry flat bands.

Rotatable member F is secured about pin 102 below the deck plate 60 via bushing 104 which is secured by secured by slide 106. Slide 106 is received by slide guide 107 and secured to the deck plate 60 with fasteners. Slide 106 may further carry a sensor for sensing a ring jam, or alternatively may be configured with attachment points for securing the ring jam sensor thereto.

Pin 102 extends through bushing 104 and is received by crank 108 and is secured to the crank with fastener 109.

Crank 108 receives and secures pin 110 with fastener 112. Crank 108 is connected to the link bar 96 with fastener 98.

Deck assembly A further carries rollers 44 preferably configured to be received by groove 42 along the inner portion of the transport ring C. Rollers 44 permit the transport ring C to rotate around the deck assembly A when driven by motor 38 and drive wheel 40.

Counting system G counting pharmaceutical units discharged through the outlet 28. Counting system G preferably comprises an IR emitter LED and IR phototransistor system in communication with the control system I. While this system is preferred, alternative systems for counting the pharmaceutical units are contemplated, such as photocell systems and camera systems.

In the embodiment illustrated counting system G is carried by block 60 and support 62, and this is secured to the base plate 16.

Hopper H collects counted pharmaceutical units. Hopper H is preferably generally cylindrical and downwardly sloped. Hopper mount 114 carries hopper face plate 116 and hopper H. Hopper mount 114 and hopper face plate 116 have indicator light slots 118, for receiving indicator lights 120.

Hopper gate 122 is carried by the hopper H, and comprises a rotatable gate which is operable for dispensing pharmaceutical units collected within the Hopper H to an appropriate dispensing unit. Gate 122 is preferably carried within hopper H. Handle 124 is attached to gate face 126. Gate face 126 is configured to have an aperture through which pharmaceutical units pass for dispensing. Handle 124 and gate face 126 are normally configured such that as pharmaceutical units collect in Hopper H they abut a solid portion of gate face 126, retaining the pharmaceutical units within the hopper H. To dispense the pharmaceutical units, handle 124 and gate face 126 is rotated to place the gate face aperture in line with a bottom portion of the hopper H, permitting the collected pharmaceutical units to be dispensed.

Hopper H and gate face 126 may be placed in electronic communication with each other and/or each may be placed in electronic communication with the control system I to send an electronic signal to the control system identifying when the handle 124 and gate face 126 are aligned with a bottom portion of hopper H to signal that collected pharmaceutical units have been dispensed and that the bin is now ready for another count cycle.

Preferably Hopper H and gate face 126 are in continuous electronic communication with each other via magnetic sensors in electronic communication with the control system I. The continuous electronic communication is in one of two states: open or closed. Control system I recognizes that collected pharmaceutical units have been dispensed and that the bin is now ready for another count cycle typically via magnetic sensor communication of a close-open-close transition. Control system I is able to act independently upon the magnetic sensor communications.

Control system I comprises a bin controller 128 with bin control software, a serial bus card 130, a master controller 132 with master control software, and a server 134. The control system I may further comprise an operator interface 136.

Bin controller 128 preferably comprises a single board computer that controls all calculations required to control an individual pharmaceutical singulation, counting and dispensing unit as previously described. It is preferred that the main central processing unit of the bin controller 128 comprise at least a 50 MHz processor and at least 128 bytes of random access memory, and the co-processor comprise at least a 0.4 MHz processor and at least 16 bytes of random access memory.

Bin controller 128 emulates the function of several different microchips. For example, in a preferred embodiment the bin controller performs the functions of: a serial data transmission interface, a variable speed and direction motor controller, a real-time clock, and a microprocessor.

Bin controller 128 is also in communication with a variety of sensors for counting pharmaceutical units, for detecting a stoppage of the transport ring C, for detecting pill dispensing via the hopper H, for detecting when an individual pharmaceutical singulation, counting and dispensing unit is opened for service, and for operating indicator lights 120 to message operating conditions to an operator.

Bin controller 128 controls the speed and direction of rotation of the transport ring C. In a preferred embodiment the bin controller samples communications from the counting system G about 300 times per second. The bin controller can detect when the counting system is dormant (i.e. not communicating pharmaceutical unit counts during a count cycle) and may further detect when the transport ring C is jammed. Typically the two conditions are related; the counting system G is dormant because the transport ring C is jammed and pharmaceutical units are not progressing to the counting system. Upon detecting a dormant count or jam, the bin controller will attempt to self clear. In a preferred embodiment the bin controller will stop the transport ring C, reverse the direction of the transport ring C, then stop and resume forward direction of the transport ring in an attempt to self clear. Preferably the bin controller will attempt to self clear in this manner at least three times prior to stopping the transport ring C and activating an indicator light 120 to message an operator an operation error has occurred.

The bin controller 128 also functions to control the particular number of pharmaceutical units to be singulated, counted and dispensed by the individual unit as previously described. To aid in obtaining an accurate pharmaceutical unit count, the bin controller slows down the transport ring C, reciprocating member E, and rotating member F, to slow down the system for the last few pills in a count cycle. The count point at which the transport ring C, reciprocating member E, and rotating member F are slowed down, as well as the speed to which they are slowed, are variable by the bin controller 128 on a per count basis, but will preferably be optimized based upon the necessary requirements of each pharmaceutical unit.

Bin controller 128 also controls the main speed of the transport ring C, and main ring speed is adjustable per count cycle.

A serial bus card 130 permits many individual pharmaceutical singulation, counting and dispensing bins 12 to connect to a single master device. Each individual pharmaceutical singulation, counting and dispensing bin 12 is individually addressable. In a preferred embodiment the serial bus card 130 can support up to 127 individual pharmaceutical singulation, counting and dispensing bins 12.

A master controller 132 with master control software is in communication with the bin controllers 128 of individual pharmaceutical singulation, counting and dispensing bins 12 via the serial bus card 130. The master controller 132 may utilize more than one serial bus card 130. Thus, the number of bins controlled by a single master controller is limited only by the master controller's expandability.

In a preferred embodiment the mater controller's software and operating system are entirely contained on at least a 256 MB compact flash card. To facilitate a master controller software upgrade, the operator may simply swap out the compact flash card. There are no mechanical or hard disk drives.

Master controller 132 may further control operator interface 136 which preferably comprises a touch screen display for operating the inventive system.

Server 134 may be in communication with master controller 132. In a preferred embodiment server 134 is provided or maintained by a pharmacy management system provider and interfaces the master controller 132 with the pharmacy management system provided.

Operator interface 136 preferably comprises a touchscreen display 137, and may further comprise a barcode reader/scanner 138. In a preferred embodiment barcode reader/scanner 138 is fixed to cabinet 14 near operator interface 136, however it is contemplated that barcode reader/scanner 138 may be portable or handheld, and need not be fixed to cabinet 14.

SUMMARY OF OPERATION

A summary of the operation of the automated system for pharmaceutical singulation, counting and dispensing will now be described.

A prescription is filled via a pharmacy management system, such as those provided by QS/1 Data Systems, Inc., of Spartanburg, S.C. Prescription data is sent from the pharmacy management system service provider's server 134 to the master controller 132 preferably via a TCP/IP interface. Master controller 80 designates an individual pharmaceutical singulation, counting and dispensing bin 12 containing the pharmaceutical unit required to fill the prescription. Master controller 132 communicates to the selected bin controller 128 via serial bus card 130 the prescription data.

The prescription data may include, but is not limited to, a transaction number, the patient's name, the name of the pharmaceutical unit to be filled, the quantity of said pharmaceutical unit to be filled, the prescriber's name, an NDC of the prescribed pharmaceutical unit, a picture or photograph of the pharmaceutical unit to be filled, the main count cycle motor speed, the near count cycle motor speed, the desired count level, the pre-count level, the near count cutoff level, the counting system noise threshold, and/or the pharmaceutical unit jam/counting system dormancy timeout duration.

The selected individual pharmaceutical singulation, counting and dispensing bin 12 initiates a count cycle to singulate, count and dispense the exact quantity and type of pharmaceutical units required by the prescription data.

Upon receiving a command to initiate a count cycle bin controller 128 activated motor 38 which rotates transport ring C. Bulk pharmaceutical units are transported along a top portion 46 of transport ring C from the storage section 20 to the singulation section 24 to the outlet 28 via the passage 32. Adjustable fingers D vertically singulate the pharmaceutical units along the transport ring C. Reciprocating member E horizontally singulates the pharmaceutical units along the transport ring. Rotatable member F separates the singulated pharmaceutical units via differential separation as the rotatable member bumps the pharmaceutical units through outlet 28 to the counting system I. Counting system I counts the discharged pharmaceutical units.

As the discharged pharmaceutical unit count nears the count total and reaches the determined slow count point, bin controller 128 slows down the motor 38, the transport ring C, reciprocating member E, and rotating member F, to slow down the system for the last few pills in a count cycle. This near count slow down is adjustable as to the near count speed at which the transport ring is driven.

Discharged counted pharmaceutical units are collected by the hopper H for dispensing into a properly labeled and authenticated dispensing bottle.

Upon detecting a dormant count or jam, the bin controller will attempt to self clear. In a preferred embodiment the bin controller 128 will stop the motor 38 and the transport ring C, reverse the direction of motor 38 and the transport ring C for an adjustably selective period, then stop motor 38 and the transport ring C and resume forward direction of motor 38 and the transport ring C in an attempt to self clear. Preferably the bin controller will attempt to self clear in this manner at least three times prior to stopping the transport ring C and activating an indicator light 120 to message an operator an operation error has occurred.

Prior to, during, or after the count cycle an operator labels a pharmaceutical unit dispensing bottle that is configured with a barcode.

Once the count cycle is complete and the operator is ready to load the pharmaceutical unit dispensing bottle, the operator scans the barcode on the prescription label affixed to the bottle. Master controller 132 receives and decodes the data contained in the barcode. Particularly, master controller 132 matches the bottle barcode data to the prescription data previously received. Master controller 132 activates indicator lights 120 which alert the operator to the correct pharmaceutical unit singulation, counting and dispensing bin 12 from which to load the bottle via indicator lights 120.

Having identified the correct pharmaceutical unit singulation, counting and dispensing bin 12 via indicator lights 120, the operator positions the bottle at the hopper H which collects the counted pharmaceutical units Hopper gate 122 is carried by the hopper H, and comprises a rotatable gate which is operable for dispensing pharmaceutical units collected within the Hopper H to an appropriate dispensing unit. Gate 122 is preferably carried within hopper H. Handle 124 is attached to gate face 126. Gate face 126 is configured to have an aperture through which pharmaceutical units pass for dispensing. Handle 124 and gate face 126 are normally configured at rest such that as pharmaceutical units collect in Hopper H they abut a solid portion of gate face 126, retaining the pharmaceutical units within the hopper H. To dispense the pharmaceutical units, handle 124 and gate face 126 is rotated to place the gate face aperture in line with a bottom portion of the hopper H, permitting the collected pharmaceutical units to be dispensed.

Hopper H and gate face 126 may be placed in electronic communication with each other and/or each may be placed in electronic communication with the control system I to send an electronic signal to the control system identifying when the handle 124 and gate face 126 are aligned with a bottom portion of hopper H to signal that collected pharmaceutical units have been dispensed and that the bin is now ready for another count cycle.

Preferably Hopper H and gate face 126 are in continuous electronic communication with each other via magnetic sensors in electronic communication with the control system I. The continuous electronic communication is in one of two states: open or closed. Control system I recognizes that collected pharmaceutical units have been dispensed and that the bin is now ready for another count cycle typically via magnetic sensor communication of a close-open-close transition, as handle 124 rotates gate 126 the circuit is changed. Control system I is able to act independently upon the magnetic sensor communications.

When handle 124 and gate 126 are returned to rest, and after a suitable waiting period, the pharmaceutical unit singulation, counting and dispensing unit then begins counting the next prescription, if needed. In one embodiment of the invention, the bins 12 may be tasked to pre-count, whereby a pre-count quantity of pharmaceutical units is constantly maintained in the hopper H for dispensing in a properly labeled and authenticated dispensing bottle. If a pre-count quantity exists, the master controller 132 may further task the bin controller 128 for counting additional pharmaceutical units into the Hopper H for the particular prescription to be filled.

While a preferred embodiment of the invention has been described using specific terms, such description is for illustrative purposes only, and it is to be understood that changes and variations may be made to the automated system for pharmaceutical singulation, counting and dispensing, whereby a bulk of stored pharmaceutical units are singulated into a single file line for counting and dispensing, its parts, and methods of manufacture, without departing from the spirit or scope of the following claims.

What is claimed is:

1. An apparatus for counting pharmaceutical units, comprising:

(a) a deck assembly;

(b) a cylindrical chamber carried by the deck assembly, wherein the walls of the chamber are oriented vertically;

(c) a pharmaceutical unit storage section, carried by the deck assembly and positioned within the cylindrical chamber, the storage section having walls, a floor and an opening adjacent the floor from which to discharge the pharmaceutical units;

(d) a horizontally oriented transport ring carried by the deck assembly and rotatable relative to the walls of the cylindrical chamber and the walls of the storage section, the transport ring having an inner perimeter, an outer perimeter and a top surface, wherein the outer perimeter of the transport ring is positioned within the walls of the cylindrical chamber, and the storage section is positioned within the inner perimeter of the transport ring, thereby forming a passage for the pharmaceutical units between the walls of the cylindrical chamber and the walls of the storage section, and further wherein the floor and opening of the storage section are oriented above the transport ring, to allow the pharmaceuticals units to be fed by gravity onto the top surface of the transport ring;

(e) a motor for rotating the transport ring;

(f) an outlet in the cylindrical chamber for discharging the pharmaceutical units from the transport ring;

(g) a hopper for receiving the pharmaceutical units discharged through the outlet;

(h) a counting system, for counting the pharmaceutical units discharged to the hopper; and (i) a controller for receiving prescription data, initiating a count cycle, controlling the transport ring motor, receiving a pharmaceutical unit count from the counting system and ending a count cycle.

2. The apparatus of claim 1, wherein the storage section is cylindrical, the walls of the storage section are oriented vertically and extend above the transport ring, and the walls of the storage section form the inner wall of the passage for the pharmaceutical units.

3. The apparatus of claim 1, further comprising means to vertically singulate pharmaceutical units on the transport ring.

4. The apparatus of claim 3, wherein the means to vertically singulate pharmaceutical units comprises a plurality of fingers depending downward toward the transport ring.

5. The apparatus of claim 4, wherein the fingers are vertically adjusted to singulate the pharmaceutical units to one unit in height.

6. The apparatus of claim 4, wherein the fingers are configured in a reverse staircase arrangement to step down the height as the pharmaceutical units travel on the transport ring.

7. The apparatus of claim 3, further comprising a reciprocating member, positioned along the inner perimeter of the transport ring, to horizontally singulate pharmaceutical units.

8. The apparatus of claim 7, wherein a gap between the reciprocating member and the wall of the cylindrical chamber can be varied, to accommodate pharmaceutical units of varying size, shapes, textures and weight.

9. The apparatus of claim 1, wherein the floor of the storage section is sloped downward to the opening in the storage section.

10. The apparatus of claim 1, wherein the transport ring further comprises surface configuration members to alter the coefficient of friction along the transport ring during rotation thereof.

11. A system for storing, counting and dispensing pharmaceutical units, comprising:

(a) a plurality of linked individual bins, each of the bins comprising a deck assembly;

a cylindrical chamber carried by the deck assembly, wherein the walls of the chamber are oriented vertically;

a pharmaceutical unit storage section, carried by the deck assembly and positioned within the cylindrical chamber, the storage section having walls, a floor and an opening adjacent the floor from which to discharge the pharmaceutical units;

a horizontally oriented transport ring carried by the deck assembly and rotatable relative to the walls of the cylindrical chamber and the walls of the storage section, the transport ring having an inner perimeter, an outer perimeter and a top surface, wherein the outer perimeter of the transport ring is positioned within the walls of the cylindrical chamber, and the storage section is positioned within the inner perimeter of the transport ring, thereby forming a passage for the pharmaceutical units between the walls of the cylindrical chamber and the walls of the storage section, and further wherein the floor and opening of the storage section are oriented above the transport ring, to allow the pharmaceuticals units to be fed by gravity onto the top surface of the transport ring;

a motor for rotating the transport ring;

an outlet in the cylindrical chamber for discharging the pharmaceutical units from the transport ring;

a hopper for receiving the pharmaceutical units discharged through the outlet;

a counting system, for counting the pharmaceutical units discharged to the hopper; and (b) a controller for receiving prescription data and, with regard to the bin containing the pharmaceutical unit identified in the prescription data, initiating a count cycle, controlling the transport ring motor, receiving a pharmaceutical unit count from the counting system and ending a count cycle.

12. The system of claim 11, further comprising (i) a bar code scanner, for scanning a bar code placed on a bottle to be filled with pharmaceutical units; (ii) indicator lights on each of the bins; and (iii) a master controller for receiving the bar code data, matching the data to the prescription data and activating the indicator light corresponding to the bin containing the pharmaceutical units corresponding to the prescription data.

13. The system of claim 11, wherein the storage section is cylindrical, the walls of the storage section are oriented vertically, and extend above the transport ring, and the walls of the storage section form the inner wall of the passage for the pharmaceutical units.

14. The system of claim 11, further comprising means to vertically singulate pharmaceutical units on the transport ring.

15. The system of claim 14, wherein the means to vertically singulate pharmaceutical units comprises a plurality of fingers depending downward toward the transport ring.

16. The system of claim 15, wherein the fingers are vertically adjusted to singulate the pharmaceutical units to one unit in height.

17. The system of claim 11, further comprising a reciprocating member, positioned along the inner perimeter of the transport ring, to horizontally singulate pharmaceutical units.

18. The system of claim 17, wherein a gap between the reciprocating member and the wall of the cylindrical chamber can be varied, to accommodate pharmaceutical units of varying size, shapes, textures and weight.

19. The system of claim 11, wherein the floor of the storage section is sloped downward to the opening in the storage section.

20. The system of claim 11, wherein the transport ring further comprises surface configuration members to alter the coefficient of friction along the transport ring during rotation thereof.

* * * * *